United States Patent [19]

Yamazaki

[11] 4,452,857
[45] Jun. 5, 1984

[54] MAGNETIC MEDIUM

[76] Inventor: Shunpei Yamazaki, c/o Semiconductor Energy Laboratory Co., Ltd., 21-21 Kitakarasuyama 7-Chome, Setagaya-Ku, Tokyo, Japan

[21] Appl. No.: 534,706

[22] Filed: Sep. 22, 1983

Related U.S. Application Data

[63] Continuation of Ser. No. 338,870, Jan. 12, 1982, Pat. No. 4,419,380.

[30] Foreign Application Priority Data

Jan. 12, 1981 [JP] Japan ................................ 56-2993

[51] Int. Cl.³ .............................................. H01F 10/02
[52] U.S. Cl. ................................... 428/328; 428/457; 428/694; 428/698; 428/900
[58] Field of Search ............... 428/328, 457, 694, 698, 428/900

Primary Examiner—Bernard D. Pianalto
Attorney, Agent, or Firm—Gerald J. Ferguson, Jr.; Joseph J. Baker

[57] ABSTRACT

A base member is disposed in a reaction chamber and a raw material gas is introduced thereinto which contains at least a compound gas of a first magnetic material, or the compound gas of the first magnetic material and an oxidizing or nitriding gas, or the compound gas of the first magnetic material and a compound gas of a second magnetic material. A plasma generating electrical energy is applied to the raw material gas to obtain therein a stream of plasma of the raw material gas, by which a stream of active reaction products is passed over the base member. As a result of this, the first magnetic material, an oxide or nitride of the first magnetic material, or a magnetic material containing the first and second magnetic materials is deposited on the base member, forming thereon a magnetic material layer which consists principally of the first magnetic material, the oxide or nitride of the first magnetic material, or the magnetic material containing the first and second materials.

5 Claims, 7 Drawing Figures

MAGNETIC MEDIUM

BACKGROUND OF THE INVENTION

1. Field of the Invention

This is a continuation of application Ser. No. 338,870, filed Jan. 12, 1982, U.S. Pat. No. 4,419,380.

The present invention relates to a method for the manufacture of a magnetic material layer which is suitable for use as a magnetic recording or storage medium.

2. Description of the Prior Art

Heretofore, there has been proposed a manufacturing method which comprises the steps of obtaining a powder of a magnetic material of $\gamma\text{-}Fe_2O_3$ (maghemite), dispersing the magnetic material powder in a binder through the use of a solvent to obtain a paint of the magnetic material powder, coating the point on a base member, and drying it, thereby to form a magnetic material layer on the base member.

However, such a conventional method involves many manufacturing steps, including the step of obtaining the magnetic material powder, the step of obtaining the paint and the step of coating and drying the paint; hence, this prior art method is disadvantageous in this respect. Further, since the magnetic material layer contains a large quantity of binder, there are imposed certain limitations on the production of the magnetic material layer for high density magnetic recording or storage use, or for higher coercive force.

Moreover, there has been proposed a method that forms a mangetic material layer on a base member by vacuum evaporation or sputtering in a vacuum vessel.

With such a method, however, as the base member must be heated up to high temperature, it is necessary to use a heat resisting and hence expensive base member. In addition, a large quantity of magnetic material adheres to the inner wall of the vacuum vessel other than the base member, so that the utilization factor of the magnetic material is extremely low.

SUMMARY OF THE INVENTION

It is therefore an object of the present invention to provide a novel magnetic material layer manufacturing method which is free from the abovesaid defects of the prior art.

According to an aspect of the present invention, a base member is disposed in a reaction chamber and a raw material gas is introduced thereinto which contains at least a compound gas of a first magnetic material, or the compound gas of the first magnetic material and an oxidizing or nitriding gas, or the compound gas of the first magnetic material and a compound gas of a second magnetic material. A plasma generating electrical energy is applied to the raw material gas to obtain therein a stream of plasma of the raw material gas, by which a stream of active reaction products is passed over the base member. As a result of this, the first magnetic material, an oxide or nitride of the first magnetic material, or a magnetic material containing the first and second magnetic material is deposited on the base member, forming thereon a magnetic material layer which consists principally of the first magnetic material, the oxide or nitride of the first magnetic material, or the magnetic material containing the first and second materials.

For the abovesaid reason, the present invention permits the fabrication of the magnetic material layer with less manufacturing steps than is needed in the prior art.

According to another aspect of the present invention, the magnetic material layer is obtained with magnetic particles of a desired particle size deposited with high density. Therefore, the magnetic material layer can be easily produced for high density magnetic recording or storage with large coercive force, as compared with those obtainable with the conventional manufacturing method.

According to another aspect of the present invention, the magnetic material layer can be obtained without heating the base member up to high temperatures. It is therefore possible to employ, as the base member, an inexpensive one as of synthetic resion.

According to another aspect of the present invention, the stream of plasma of the raw material gas is applied a magnetic field in the direction of its flow, with such a distribution of the magnetic field intensity that increases towards the center of the flow of plasma from the outside thereof. This prevents that the material for forming the magnetic material layer are unnecessarily deposited on the inner wall of the reaction chamber. Hence the material for the magnetic material layer can be used more efficiently than in the past.

According to another aspect of the present invention, by applying a magnetic field to the stream of plasma of the raw material in the direction of its flow, the particles of the material for the magnetic material layer can be deposited in a columnar or acicular form on base member, providing for improved magnetic characteristics of the resulting magnetic material layer.

According to another aspect of the present invention, a magnetic field is applied to the stream of plasma of the raw material gas in the direction of its flow and an orientation magnetic field is applied to the stream of reaction products. This enables that the particles of the material for the magnetic material layer are deposited in a columnar or acicular form on the base member and that they lie flat in the direction of the major plane of the base member or stand upright perpendicularly thereto. Accordingly, the magnetic characteristics of the magnetic material layer can be obtained as desired.

According to still another aspect of the present invention, by controlling the power of the plasma generating electrical energy for creating the plasma of the raw material gas, the particles of the material for the magnetic material layer can be deposited as amorphous, semi-amorphous or crystalline material particles on the base member. Therefore, the magnetic material layer can be imparted desired magnetic characteristics.

Other objects, features and advantages of the present invention will become more apparent from the following detailed description taken in conjunction with the accompanying drawings.

DESCRIPTION OF THE PREFERRED EMBODIMENTS

Figure 1:
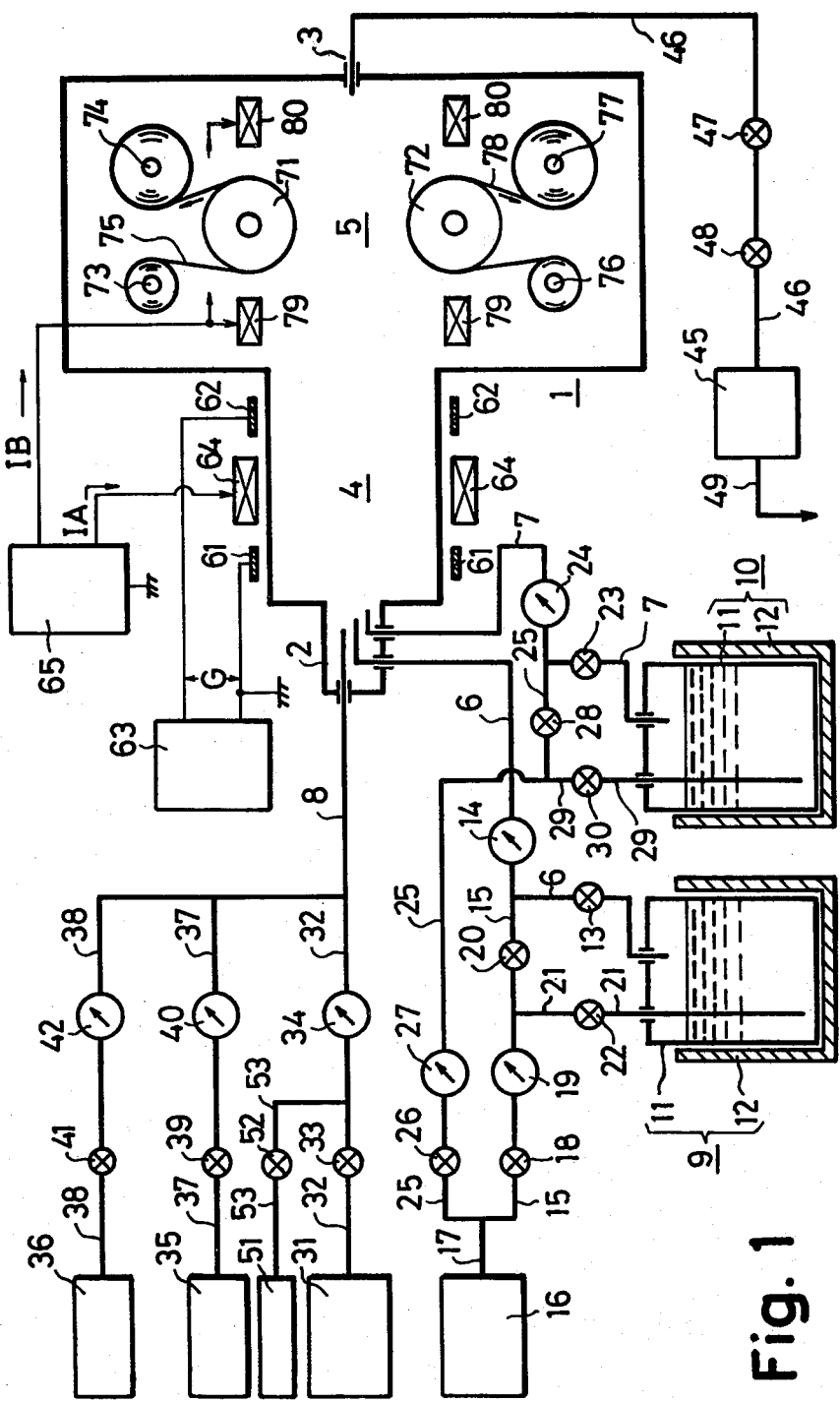
FIG. 1 is a schematic diagram illustrating an arrangement for use with the manufacturing method embodying the present invention and explanatory of its embodiments.

FIG. 1 illustrates an example of equipment for use with an embodiment of the manufacturing method of the present invention. The equipment is provided with a reaction chamber 1.

The reaction chamber 1 has a gas inlet 2 and a gas outlet 3 and constitutes a gas plasma generating region 4 on the side of the gas inlet 2 and a magnetic material depositing region 5 on the side of the gas outlet 3. The gas inlet 2 has inserted therein pipes 6, 7 and 8 at one ends thereof. The other ends of the pipes 6 and 7 extend into reservoirs 11 of magnetic material compound gas sources 9 and 10, which are each provided with a heater 12.

The pipe 6 has a valve 13 and a flowmeter 14, with the former disposed on the side of the gas source 9. Between the valve 13 and the flowmeter 14 of the pipe 6 is connected one end of a pipe 15, the other end of which is connected to a pipe 17 connected to a carrier gas source 16. The pipe 15 has mounted thereon a valve 18, a flowmeter 19 and a valve 20 in this order, with the valve 18 disposed on the side of the carrier gas source 16. Between the flowmeter 19 and the valve 20 of the pipe 15 is connected thereto one end of a pipe 21 the other end of which extends into the reservoir 11 of the gas source 9. The pipe 21 has mounted thereon a valve 22.

On the pipe 7 are mounted a valve 23 and a flowmeter 24 with the former on the side of the gas source 10. Between the valve 23 and the flowmeter 24 of the pipe 7 is connected thereto one end of a pipe 25 having the other end linked with the pipe 17. The pipe 25 has mounted thereon a valve 26, a flowmeter 27 and a valve 28 in this order, with the valve 26 on the side of the carrier gas source 16. Between the flowmeter 27 and the valve 28 of the pipe 25 is linked thereto one end of a pipe 29 the other end of which extends into the reservoir 11 of the gas source 10. The pipe 29 has a valve 30.

To the pipe 8 is coupled one end of a pipe 32 having the other end linked with oxidizing or nitriding gas source 31. A valve 33 and a flowmeter 34 are inserted in the pipe 32, with the valve 33 on the side of the gas source 31. Between the valve 33 and the flowmeter 34 of the pipe 32 is connected thereto one end of a pipe 53 which is coupled at the other end with a pretreatment gas source 51 and has mounted thereon a valve 52. To the pipe 8 are connected pipes 37 and 38 at one end thereof which are linked at the other end with additive gas sources 35 and 36, respectively. The pipe 37 has inserted therein a valve 39 and a flowmeter 40, and the pipe 38 has inserted therein a valve 41 and a flowmeter 42.

To the gas outlet 3 is connected one end of a pipe 46 having the other end linked with an exhaust pump 45. Mounted on the pipe 46 are a stop valve 47, and a needle valve 48. From the exhaust pump 45 extends to the outside an exhaust tube 49.

Around the gas plasma generating region 4 are disposed ring-shaped gas plasma generating electrodes 61 and 62 apart at a required distance in the direction in which the gas inlet 2 and the gas outlet 3 are aligned. A source 63 of a gas plasma generating electric power G is connected to the electrodes 61 and 62. Disposed between the electrodes 61 and 62 a field generating coil 64, which is supplied with a current IA from a magnetic field generating current source 65.

In the magnetic material depositing region 5 are disposed a pair of rollers 71 and 72 in opposing relation across the line joining the gas inlet 2 and the gas outlet 3. On the roller 71 and 72 are placed respectively film-like base member 75 and 78 which extend between pairs of reels 73 and 74 and 76 and 77, respectively.

Furthermore, in the region 5, there are disposed two orientation magnetic field generating coils 79 and 80, which are respectively supplied with an orientation magnetic field generating current IB from the magnetic field generating current source 65.

The above is a description of an example of the equipment for an embodiment of the manufacturing method of the present invention. According to the embodiment of this invention method, a magnetic material layer is produced through utilization of such equipment as described below.

EXAMPLE 1

Placement of Base Member

At first, the valves 13, 23, 18, 26, 33, 39 and 41 on the outlet side of the gas sources 9, 10, 16, 31, 35 and 36 are all closed, the valves 22 and 23 on the inlet side of the gas sources 9 and 10 are both closed and the valves 20 and 28 inserted in the pipes 15 and 16 are both closed as well. In such a state, the base members 75 and 78 wound on pairs of the reels 73 and 74 and 76 and 77 are respectively set in such a manner that they are directed around the rolls 71 and 72 as predetermined. In this case, the base members 75 and 78 are held at room temperature to 300° C. through the rolls 71 and 72, respectively.

Pretreatment of Base Members

After setting the base members 75 and 78 in the reaction chamber 1 as described above, the exhaust pump 45 is actuated, with the valves 47 and 48 fully opened, making the interior of the reaction chamber 1 vacuous.

Following this, the valve 52 of the pretreatment gas source 51 is opened to introduce pretreatment gas, such as oxygen gas or inert gas into the reaction chamber 1. In this case, the pressure in the reaction chamber is maintained at a predetermined value below 20 Torr, for instance, at 0.3 Torr by properly adjusting the opening of the valve 53 and the valve 48 while reading the indication of the flowmeter 34.

Next, the power source 63 is turned ON, from which the gas plasma generating power G having a frequency of 13.56 MHz is applied across the electrodes 61 and 62, imparting plasma generating electrical energy to the pretreatment gas in the region 4 of the reaction chamber 1. As a result of this, a stream of plasma of the pretreatment gas is created which flows from the side of the region 4 to the side of the region 5 in the reaction chamber 1.

After this, the base members 75 and 78 are driven to travel from the reels 73 and 76 to the reels 74 and 77, respectively, at a speed of 1 to 100 m/minute.

In this while, the pretreatment gas plasma acts on the surfaces of the base members 75 and 78 being paid out from the reels 73 and 76, respectively. Thus the surfaces of the base members 75 and 78 are pretreated.

Upon completion of the pretreatment of the entire areas of the surfaces of the base members 75 and 78, the power source 63 is stopped from operation and the valve 52 is closed, then the interior of the reaction chamber 1 is made vacuous by the exhaust pump 45.

Thus the pretreatment of the base members 75 and 78 is finished.

Formation of Magnetic Material Layer on Base Members

Preparations are made for obtaining a raw magnetic material compound gas(hereinafter referred to as the gas A) in the reaction chamber 1.

To this end, there is stored in the reservoir 11 of the gas source 9 a raw magnetic material compound such as consists of principally of iron bormide (sublimation temperature 27° C.) expressed by $FeBr_2$ and $FeBr_3$, iron chloride (liquefaction temperature 282° C. and evaporation temperature 315° C.) expressed by $FeCl_3$, iron pentacarbonyl (boiling point 103° C.) expressed by $Fe(CO)_5$, iron nonacarbonyl (boiling point 100° C.) expressed by $Fe_2(CO)_9$, cobalt carbonate (boiling point 51° to 52° C.) expressed by $Co_2(CO)_8$, or nickel carbonate (boiling point 43° C.) expressed by $Ni(CO)_4$. The reservoir 11 is heated by the heater 12 up to a temperature high enough to generate gas of the raw matnetic material compound in such a state that the reversoir 11 is connected with the reaction chamber 1 helt at a low atmospheric pressure below 20 Torr as referred to later. For example, in the case where the raw magnetic material compound consists principally of the iron bromide, the reservoir 11 is heated up to a temperature, for instance, 0° to 20° C. which is lower than the sublimation temperature (27° C.) of the iron bromide. When the raw magnetic material compound consists principally of the iron chrolide, the heating temperature is 280° to 320° C. In the case of the iron carbonate, the heating temperature is 70° to 120° C. In the case of the cobalt carbonate, the heating temperature is 100° to 150° C. and in the case of nickel carbonate, the temperature of the reservoir may be room temperature, preferably a little higher temperature.

After completion of above said preparations and the pretreatment of the base members 75 and 78, the valves 18 and 20 of the carrier gas source 16 are opened, introducing a carrier gas (hereinafter referred to as the gas C), such as $H_2$ or He gas, into the reaction chamber 1 at a rate of 50 to 300 cc/minute. Then the valve 13 of the gas source 9 is opened.

As a result of this, the reservoir 11 of the gas source 9 communicates with the reaction chamber 1 and although the gas C is being introduced in the reaction chamber 1, its interior is held at a low atmospheric pressure, so that the gas A is introduced from the gas source 9 into the reaction chamber 1. In this case, by opening the valve 22 to introduce a portion of the gas C into the reservoir 11, the gas A can be effectively supplied to the reaction chamber 1.

In this way, obtaining in the chamber 1 a stream of a mixture gas (A+C) of the gas A and C which flows through the regions 4 and 5 in this order. In this case, by appropriately adjusting the opening of the valves 13, 18 20, 22 and 48 while observing the flowmeters 19 and 14, the pressure by the mixture gas (A+C) in the reaction chamber 1 is maintained at a predetermined value ranging 0.001 to 20 Torr, for instance, 0.3 Torr.

Following this, the power source 63 is activated to supplying therefrom the gas plasma generating power G of a 13.56 MHz frequency across the electrodes 61 and 62, imparting plasma generating electrical energy to the mixture gas (A+C) in the region 4 of the reaction chamber 1. This creates a stream of plasma of the mixture gas (A+C) that flows from the region 4 to the region 5 in the reaction chamber 1 and a stream of reaction products including active ones is passed over the base members 75 and 78 placed in the region 5. That is to say, there is produced a stream of reaction products containing active particles of a magnetic material such as Fe, Co or Ni. In FIG. 1, the rolls 71 and 72 are shown to be disposed in the reaction chamber 1 so that the stream of reaction products may be directed along the surfaces of the base members 75 and 76 at these areas overlying the rolls 71 and 72.

Furthermore, the magnetic field generating current source 65 is turned ON to supply therefrom a magnetic field generating current IA to the coil 64, applying a magnetic field to the stream of the mixture gas plasma in the direction of its flow. This magnetic field has such a field intesntiy distribution that the intensity increases towards the center of the region 4 from the outside thereof. The intensity of this magnetic field can be made to $10^2 \sim 5 \times 10^3$ gausses at the center of the region 4. On the other hand, the stream of the mixture gas plasma includes a stream of particles of the magnetic material, so that the stream of active particles of the magnetic material is compressed at the center of the region 4.

Moreover, a magnetic field generating current IB is supplied from the current source 65 to the coils 79 and 80, applying an orientation magnetic field to the stream of the reaction products. In FIG. 1, the coils 79 and 80 are shown to be disposed so that the orientation magnetic field may be obtained in the direction of flow of the reaction products, i.e. in the direction along the surfaces of the base members 75 and 78 at those areas overlying the rolls 71 and 72. Next, the base members 75 and 78 maintained between room temperature and 300° C. are driven to travel from the reels 74 and 77 to those 73 and 78 at a rate of 1 to 100 m/minute.

In consequence, the active reaction products, i.e. the active particles of the aforementioned magnetic material are deposited over the entire areas of the surfaces of the base members 75 and 78, respectively. Thus a magnetic material layer consisting of the magnetic material, such as Fe, Co or Ni, is formed on the surface.

Next, the power source 63 and the current source 65 are turned OFF and the valves 13, 18, 20 and 22 are closed and the interior of the reaction chamber 1 is made vacuum by means of the exhaust pump 45.

Following this, the exhaust pump 45 is stopped and the valve 52 is opened to introduce the pretreatment gas into the reaction chamber 1 from the gas source 51, after which the pressure of the interior of the chamber 1 is set to the atmospheric pressure and the valve 52 is closed.

Thereafter, the magnetic media are taken out from the reaction chamber 1 together with the reels 73, 74 and 76, 77.

The above is a description of the first embodiment of the magnetic material layer manufacturing method of the present invention.

Figure 2A:
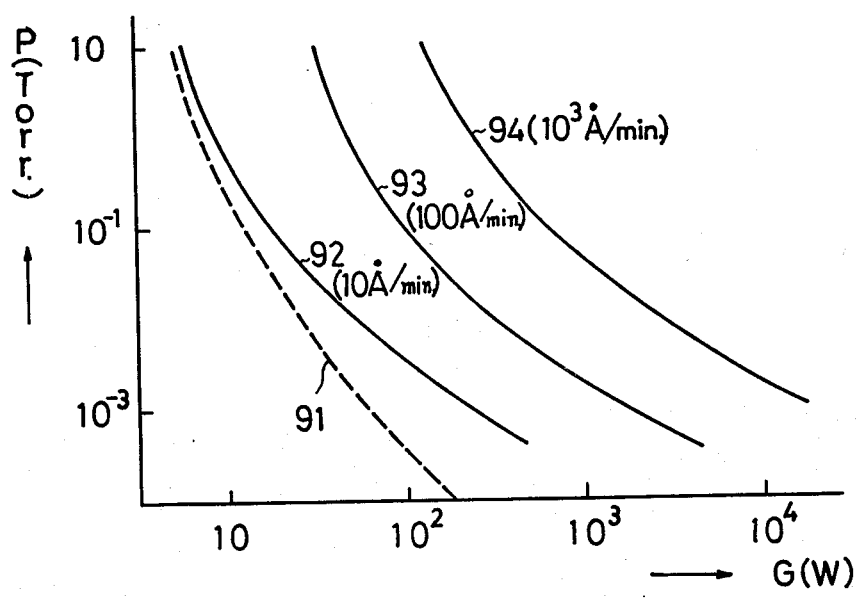
FIG. 2A is a graph showing the relationship between the power of discharge and the pressure in the reaction chamber, using the growth rate of the magnetic material as a parameter.

According to such an embodiment as described above, by controlling either one or both of the plasma generating power G (watt) and the atmospheric pressure P (Torr) in the chamber 1, it is possible to control the growth rate or the thickness of the magnetic material layer. FIG. 2A generally shows this relationship. The curve 91 indicates that no magnetic material layer is formed with the pressure P and the power G in the region between the curve 91 and the ordinate. The curve 92, 93 and 94 show that the matnetic material layer is formed at rates of 10, 100 and 1000 Å/minute, respectively, by the pressure P and the power G on these curves.

Figure 2B:
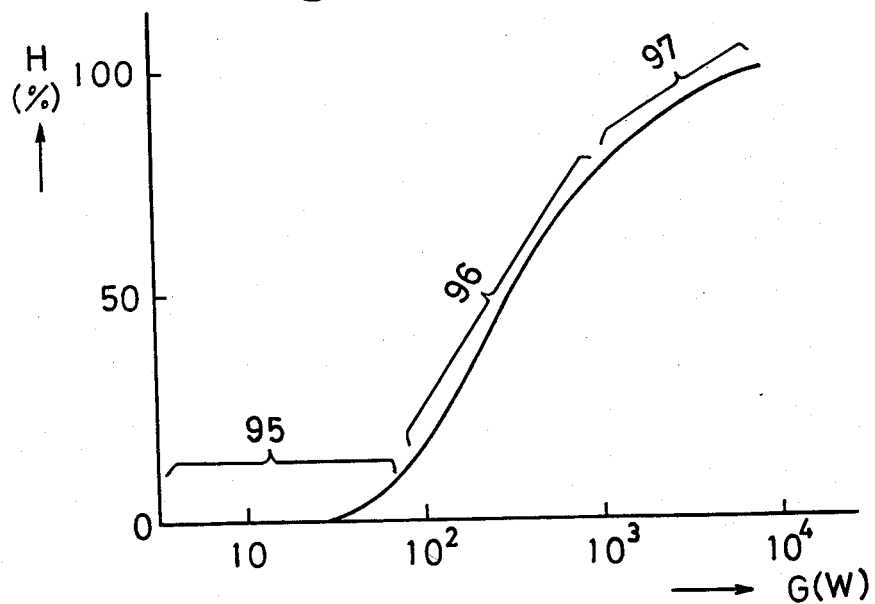
FIG. 2B is a graph showing the relationship between the power of discharge and the crystallization of the material for the magnetic material layer.

Further, according to the above-described embodiment, the degree of crystallization H of particles of the material forming the magnetic material layer can be controlled by controlling the plasma generating power G. FIG. 2B shows the relationship between them. The curves 95, 96 and 97 indicate that the particles of the abovesaid material are obtained as amorphous, semiamorphous and crystalline particles by the power G in the regions indicated by these curves.

Figure 2C:
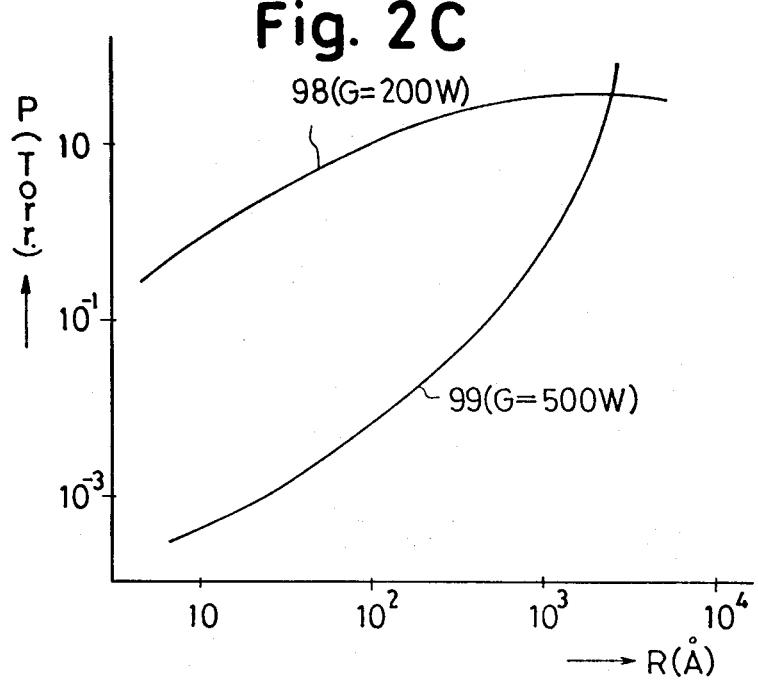
FIG. 2C is a graph showing the relationship between the mean particle size of the material for the magnetic material layer and the pressure in the reaction chamber, using the power of discharge as a parameter.

By controlling either one or both of the power G and the pressure P, the mean particle size of the abovesaid material particles in the direction of the shorter axis thereof R (Å) can be controlled to range from 10 to 2000 Å, preferably, between 50 to 200 Å. FIG. 2C shows generally this relationship. The curves 98 and 99 respectively indicate the relationships of the mean particle size R to the pressure P when the power G is 200 and 500 W and consequently when the particles of the material forming the magnetic material layer are semi-amorphous.

Figure 3A:
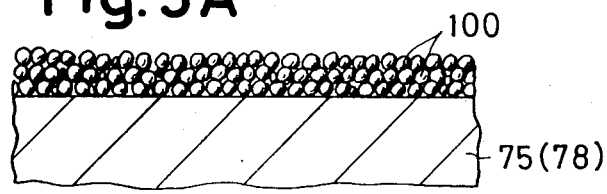
FIGS. 3A, 3B and 3C are sectional views schematically illustrating examples of the construction of the magnetic material layer obtainable with the manufacturing method of the present invention.
Figure 3B:
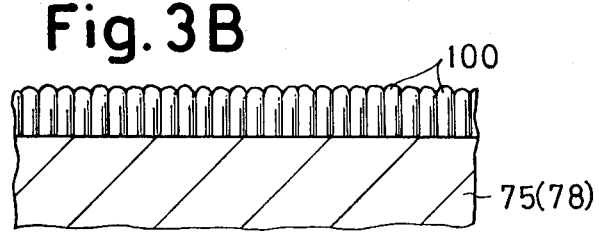
Figure 3C:
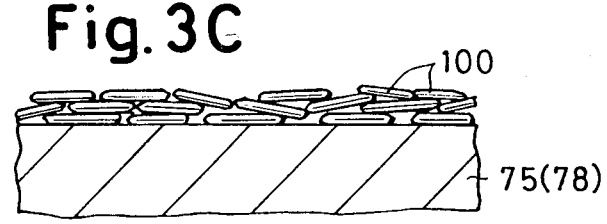

Besides, by controlling the intensity of the magnetic field set up by the coil 64 and the direction of the orientation magnetic field by the coils 79 and 80 relative to the surfaces of the base members 75 and 78, it is possible to control the shape and direction of the particles of the material forming the magnetic material layer. FIGS. 3A to 3C are explanatory of this. FIG. 3A shows that the particles 100 are obtained in substantially a spherical form; FIG. 3B shows that the particles 100 are obtained in a columnar form and are deposited on the base member in the direction perpendicular to its surface; and FIG. 3C shows that the particles 100 are obtained in an acicular form and are deposited on the base member in the direction of its surface.

In addition, the magnetic field by the coil 64 can be equipped with such a field intensity distribution that the intensity increases towards the center of the region 4 from the outside thereof. This eliminates the possibility that the active reaction products occurring in the stream of plasma unnecessarily adhere to the inner wall of the reaction chamber 1.

Accordingly, the first embodiment of the present invention has the advantage that the magnetic material layer can be efficiently obtained with desired magnetic characteristics.

EXAMPLE 2

As is the case with Example 1, the base members 75 and 78 are placed in the reaction chamber 1, then subjected to pretreatment.

The pretreatment is followed by a step of forming on each of the base members 75 and 78 a magnetic material layer different from that in Example 1.

Prior to this step, preparations are made so that the raw material compound gas A may be obtained from the gas source 9 as in the case of Example 1.

After this, the gas A is introduced into the reaction chamber 1 together with the carrier gas C as in the case of Example 1.

The valve 33 of the gas source 31 is opened, through which an oxidizing gas (hereinafter referred to as the gas O) available from the gas source 31, such as $O_2$ gas, is supplied to the reaction chamber 1.

Thus there is produced a stream of a mixture gas (A+O+C) of the gases A, O and C in the reaction chamber 1.

Next, as is the case with Example 1, the power source 63 is activated to impart the plasma generating electrical energy to the mixture gas (A+O+C), creating a stream of plasma of the mixture gas (A+O+C) in the chamber 1. As a result of this, a stream of active reaction products, for instance, active particles of $Fe_2O_3$, is passed over the base members 75 and 78. Then, as in the case of Example 1, the current source 65 is turned ON to apply a magnetic field to the stream of plasma of the mixture gas (A+O+C) by the coil 64 and apply an orientation magnetic field to the stream of active reaction products.

After this, the base members 75 and 78 are driven to travel in the same manner as in Example 1 to deposit oxide particles, for example, $\gamma$-$Fe_2O_3$ particles on the surfaces of the base members 75 and 78, thus obtaining a magnetic medium having a magnetic material layer consisting principally of oxide of the magnetic material, for instance, $\gamma$-$Fe_2O_3$.

Following this, as in the case of Example 1, the power soruce 63 and the current source 65 are turned OFF and the valves 13, 18, 20, 22 and 33 are closed, after which the interior of the reaction chamber 1 is made vacuous.

Next, as in the case of Example 1, the valve 52 is once opened to set the pressure in the reaction chamber 1 at the atmospheric pressure through the pretereatment gas from the gas source 51. Thereafter, the magnetic media are taken out from the reaction chamber 1.

The above is a description of the second embodiment of the manufacturing method of the present invention. This embodiment, though not described in detail, has the same advantages as those described previously in respect of Example 1.

EXAMPLE 3

In accordance with this Example, though not described in detail, a magnetic medium having a magnetic material layer consisting principally of nitride of the magnetic material, for example, $FeN_x$ ($0.1 < x < 2.0$) and formed on each of the base members 75 and 78 were obtained by the manufacturing steps which were identical with those involved in Example 2 except that the oxidizing gas O was replaced with a nitriding gas N, for example, $NH_3$ gas.

This embodiment also has the same advantages as in the case of Example 1, though not described in detail.

EXAMPLE 4

As in the case with Examples 1 to 3, the base members 75 and 78 are pretreated, after which a magnetic material layer different from that in the foregoing Examples is formed on each of the base members 75 and 78, although no detailed description will be given.

Prior to the above step, preparations are made so that a raw material compound gas (hereinafter referred to as the gas B) different from the gas A may be obtained from the gas source 10 as is the case with Examples 1 to 3. In this case, if the gas A is, for example, the the iron carbonate gas mentioned previously in Example 1, cobalt or nickel carbonate gas, for instance, is used as the gas B. And, for example, when the cobalt carbonate gas is employed as the gas A, the nickel carbonate gas, for instance, is used as the gas B.

Next, as in the cases of Examples 1 to 3, the gases A and B are introduced into the reaction chamber 1 using the carrier gas C to produce therein a stream of the mixture gas (A+B+C) of the gases A, B and C.

Then, the power source 63 is turned ON to create a stream of plasma of the mixture gas (A+B+C) in the reaction chamber 1, whereby a stream of reaction products, for instance, active particles of a magnetic material mixture or ally containing Fe and Co, Fe and Ni or Co and Ni is passed over the base members 75 and 78.

Further, magnetic fields are applied by the coils 64, and 79 and 80 to the mixture gas (A+B+C) and the reaction products as in the cases of Examples 1 to 3.

Next, as in the case of Example 1, the base members 75 and 78 are driven to travel, forming on each of them a magnetic material layer consisting principally of Fe and Co, Fe and Ni or Co and Ni, for instance. Thus magnetic media are obtained.

Thereafter the magnetic media are taken out from the reaction chamber 1.

Though not described in detail, this Example possesses the same advantages as those of Examples 1 to 3.

EXAMPLE 5

According to this Example, though not described in detail, in the magnetic material layer producing step of any one of Examples 1 to 4, either one or both of a first additive gas containing boron (B) or phosphorus (P) as a vitrifying agent, such as $B_2H_6$ or $PH_3$ gas, and a second additive gas containing Mn or Mo, such as $Mn_2(CO)_{10}$ or $Mo(CO)_6$ gas, are introduced into the reaction chamber 1 from the gas sources 35 and 36, respectively. As a result of this, a magnetic material layer similar to that obtainable with any one of Examples 1 to 4 is doped with the abovesaid first and/or second additive materials.

This Example also has the same advantages as those obtainable with Examples 1 to 4. In this Example, however, when the abovesaid vitrifying agent is added to the magnetic material layer, the particles of the material for the magnetic material layer can be obtained with a large ratio of lengths of each particle in the directions of its longer and shorter axes as compared with such ratios in Examples 1 to 4. When Mn or Mo is added, the coercive force of the magnetic material layer can be enhanced as compared with the cases of Examples 1 to 4.

The foregoing Examples should be construed as being merely illustrative of the invention but not in a limiting sense. For example, a hard plate can also be used as the base member; the plasma generating electrical energy can also be obtained with electric power ranging from a DC power to microwave one; the particles of the material for the magnetic material layer can also be obtained in a hemispehrical or elliptic form; further, the magnetic material layer can also be obtained as doped with Sm, Ti or Zn.

It will be apparent that many modifications and variations may be effected without departing from the scope of the novel concepts of this invention.

What is claimed is:

1. A magnetic medium comprising:
   a base member; and
   a magnetic material layer formed thereon and composed principally of amorphous or semi-amorphous particles of a magnetic material selected from a group consisting of Fe, Ni, and Co.

2. A magnetic medium comprising:
   a base member; and
   a magnetic material layer formed thereon and composed principally of amorphous or semi-amorphous particles of nitride of a magnetic material selected from a group consisting of Fe, Ni and Co.

3. A magnetic medium comprising:
   a base member; and
   a magnetic material layer formed thereon and composed principally of amorphous or semi-amorphous of a magnetic material mixture or alloy containing a first magnetic material selected from a group consisting of Fe, Ni, or Co and a second magnetic material selected from the remaining two of Fe, Ni and Co.

4. A magnetic medium according to one of claims 1 to 3, wherein the amorphous or semi-amorphous particles are columnarshaped and diposited on the base member in a direction vertical to the surface thereof.

5. A magnetic medium according to one of claims 1 to 3, wherein the amorphous or semi-amorphous particles are acicularshaped and deposited on the base member in a direction lateral to the surface thereof.

* * * * *